(12) United States Patent
Lee et al.

(10) Patent No.: US 6,601,052 B1
(45) Date of Patent: Jul. 29, 2003

(54) SELECTIVE ATTENTION METHOD USING NEURAL NETWORK

(75) Inventors: Soo Young Lee, Taejon-si (KR); Ki Young Park, Taejon-si (KR)

(73) Assignee: Korea Advanced Institute of Science and Technology, Taejon-si (KR)

( * ) Notice: Subject to any disclaimer, the term of this patent is extended or adjusted under 35 U.S.C. 154(b) by 334 days.

(21) Appl. No.: 09/598,006

(22) Filed: Jun. 19, 2000

(30) Foreign Application Priority Data

Jun. 16, 1999 (KR) ........................................ 1999-23099

(51) Int. Cl.[7] .............................................. G06F 15/18
(52) U.S. Cl. ............................ 706/25; 706/14; 706/15; 706/16; 706/22; 706/31
(58) Field of Search .............................. 706/14, 15, 16, 706/22, 25–44

(56) References Cited

U.S. PATENT DOCUMENTS

| 5,014,219 | A | * | 5/1991 | White .......................... 706/25 |
| 5,353,207 | A | * | 10/1994 | Keeler et al. ................... 700/44 |
| 5,446,829 | A | * | 8/1995 | Wang et al. .................... 706/21 |
| 5,673,367 | A | * | 9/1997 | Buckley ........................ 706/23 |
| 5,687,286 | A | * | 11/1997 | Bar-Yam ...................... 704/232 |
| 6,014,452 | A |   | 1/2000 | Zhang et al. ................ 382/132 |
| 6,023,693 | A | * | 2/2000 | Masuoka et al. .............. 706/25 |

OTHER PUBLICATIONS

"Correlates of Attention in a Model of Dynamic Visual Recognition", By Rajesh P. N. Rao, Department of Computer Sciencem Univ. of Rochester.

Neural Network Model for Selective Attention in Visual Pattern Recognition and Associative Reca, By Kunihikp Fukushima, NHK Science and Tech. Research Lab. Apr. 20, 1987.

* cited by examiner

Primary Examiner—John Follansbee
Assistant Examiner—Michael B. Holmes
(74) Attorney, Agent, or Firm—Bachman & LaPointe, P.C.

(57) ABSTRACT

The present invention discloses an implementation of the selective attention mechanism occurring in the human brain using a conventional neural network, multi-layer perceptron and the error back-propagation method as a conventional learning method, and an application of the selective attention mechanism to perception of patterns such as voices or characters. In contrast to the conventional multi-layer perceptron and error back-propagation method in which the weighted value of the network is changed based on a given input signal, the selective attention algorithm of the present invention involves learning a present input pattern to minimize the error of the output layer with the weighted value set to a fixed value, so that the network can receive only a desired input signal to simulate the selective attention mechanism in the aspect of the biology. The present invention also used the selective attention algorithm to define the degree of attention to a plurality of candidate classes as a new criterion for perception, thus providing high perception performance relative to the conventional recognition system for a single candidate class.

3 Claims, 4 Drawing Sheets

SELECTIVE ATTENTION METHOD USING NEURAL NETWORK

BACKGROUND OF THE INVENTION

1. Field of the Invention

The present invention relates to a neural network and learning method thereof, e.g., error back-propagation method and, more particularly, to a selective attention method using neural networks in which the error back-propagation method is applied to an input layer to change an input value rather than a weight values of the neural networks and use the difference between the new input value and the original one as a criterion for recognition, wherein a selective filter is added before the conventional recognition networks in order to change the input value and technologically simulate the selective attention mechanism occurring in the human brain, thus implementing a system applying the selective attention mechanism to perception of patterns such as voice or character.

2. Description of the Related Art

Generally, selective attention means concentrating an attention to a specific one of at least two simultaneous input information or signals based on the significance of the information or signal. This selective attention is a phenomenon naturally occurring in the human brain.

For example, every man can recognize a desired voice signal in the situation where many people talk at the same time, from a difference between the voice signals in the frequency or the location of the voice source. Such a selective attention is the one of the subjects of which the principle has been studied in the psychology for a long time with respect to both human and animals.

Many studies have been made on the selective attention mechanism in the field of the psychology and neuroscience and are classified into two categories: the one category is the initial selection theory that unwanted signals of several stimuli are filtered out through a selective filter prior to processing the stimuli in the brain; and the other is a theory that all signals are transferred to the processor of the brain but the brain responses more strongly to the more important signals.

These theories are still in a heated controversy and the prevailing opinion is that a combination of the two theories explains the selective attention mechanism in the human brain.

There is an attempt to technologically simulate the selective attention mechanism for more effective recognition of actual voices or characters. Although the existing studies have well simulated the selective attention mechanism in the human brain in an aspect of the neuroscience, they are meaningful only in the aspect of the biology and much hard to applying to the actual recognition. Also, there are many difficulties to implement the results of the studies used in the actual recognition in software or hardware due to extreme complexity of the structure.

The representative one of the systems developed to overcome the above-stated problems is a multi-layer perceptron system, which is widely applied to the mechanical brain called "neuron" or "neural network". The multi-layer perceptron system enables recognition or judgment of potential information (pattern) through iterative learning of a defined pattern.

Although the neural networks in the form of a mechanical brain according to the multi-layer perceptron system have excellent adaptability to a repeatedly acquired pattern, they are disadvantageous in that the recognition performance is abruptly deteriorated for input patterns different from the acquired pattern used during training phase.

A description will now be made in detail with reference to FIG. 1 as to the drawbacks of the prior art.

Figure 1:
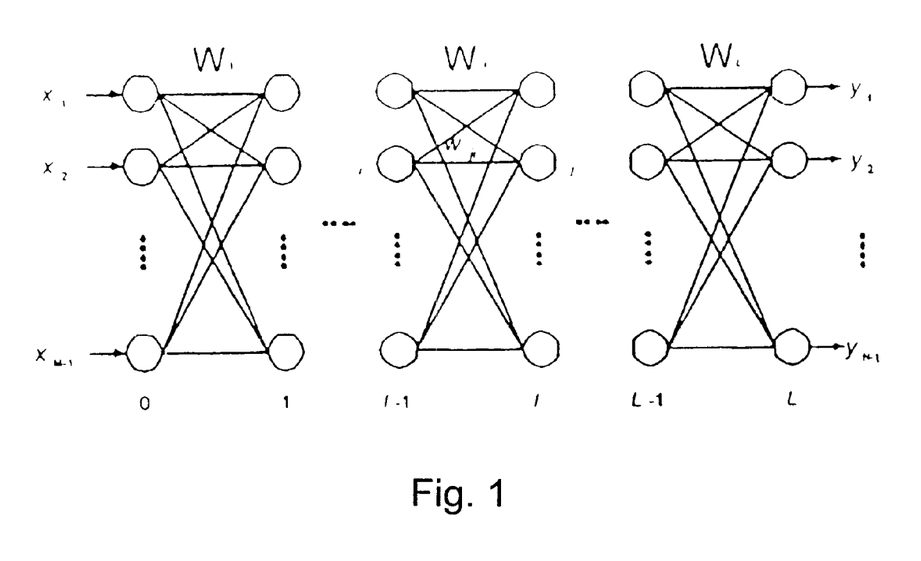
FIG. 1 is an exemplary diagram for explaining a feed-forward neural network.

Referring to FIG. 1, a typical multi-layer perceptron is a neural network having a layer structure that includes at least one intermediate layer between input and output layers, i.e., it is a series of several single-layer perceptrons.

An input value applied to an input layer is multiplied by the weighted value of a synapse linked to the individual neurons and the resulting values are summed at the neuron of the adjacent intermediate layer. The output value of the neuron is transferred to the next intermediate layer. This process is performed in an iterative manner until the output layer. That is, an input value of the j'th neuron of the l'th intermediate layer, as denoted by $\hat{h}_j^l$ is calculated according to Equation 1.

$$\hat{h}_j^1 = w_{j0}^1 + \sum_{k=1}^{N} w_{jk}^1 h_k^{l-1} = \sum_{i=0}^{N} w_{jk}^1 h_k^{l-1} \quad \text{[Equation 1]}$$

where $w_{j0}^l$ represents the bias of $\hat{h}_j^l$; $w_{jk}^l$ represents the weighted value of a synapse linking the k'th neuron of the (l−1)'th intermediate layer to the j'th neuron of the l'th intermediate layer; $h_k^{l-1}$ represents the output value of the k'th neuron of the (l−1)'th intermediate layer; and variable N represents the number of the neurons of the (l−1)'th intermediate layer.

Thus the output value from the input $\hat{h}_j^l$ of the j'th neuron in the l'th intermediate layer is defined as Equation 2.

$$h_j^1 = f(\hat{h}_j^1) = \frac{2}{1 + \exp(-\hat{h}_j^1)} \quad \text{[Equation 2]}$$

For a correct operation of the above-structured multi-layer perceptron as a perception means, it is a requisition that the synapses linking the individual neurons have an adequate weighted value, of which the determination involves a learning process of the multi-layer perceptron and performed by the layer according to the error back-propagation algorithm.

The learning process of the multi-layer perceptron involves receiving P learning patterns at the input layer, determining a desired output value corresponding to the individual learning patterns as a target value, and calculating the weighted value of a synapse which minimizes the MSE between the actual output value and the target value of the output layer.

Accordingly, the MSE can be calculated according to Equation 3.

$$E = \frac{1}{2}\sum_{P=1}^{N} \|t^P - y^P\|^2 \quad \text{[Equation 3]}$$

where P learning patterns are $x^P$ (p=1, 2, ..., P). $y^P$ is an output vector; and $t^P$ is a target vector.

In the error back-propagation system, the weighted value of the output layer is iteratively applied according to Equation 4 in order to minimize the MSE from the Equation 3.

$$w^1_{ij(new)} = w^1_{ij(old)} + \eta \delta^1_j h^{l-1}_i \quad \text{[Equation 4]}$$

where constant $\eta$ represents a learning rate; and $\delta_j^l$ represents a differential value of the error for the output layer with respect to the neuron value of the individual intermediate layers. The differential value of the error for the output layer can be defined as Equation 5.

$$\delta_i^L = (L_i - y_i)f'(\hat{y}_i) \quad l \in \text{ output layer; and} \quad \text{[Equation 5]}$$

$$\delta_i^1 = -f'(\hat{h}_j^1)\sum_i \delta_i^{l-1} w_{ij}^{l+1}, \quad l \in \text{ intermediate layer.}$$

In summary, the conventional error back-propagation system according to the above equations is an algorithm repeating for P learning patterns, which involves calculating the total errors of the output layer as Equation 3 from given input and target vectors through the feed-forward propagation according to Equation 1, and differentiating the errors of the output layer with respect to the neuron value of the individual intermediate layers as defined in Equation 5 to change the weighted value of the synapse and thus minimize the total errors of the output layer.

Such a multi-layer perceptron that involves simple iterative calculations to divide given input patterns into several classes is a traditional neural net popular in solving the problem relating to pattern recognition. However, the multi-layer perceptron is problematic in that perception performance may rapidly deteriorate with regard to inputs different from the already learnt patterns. Accordingly, the present invention is directed to adding a selective filter using the error back-propagation process before the conventional perception means to realize selective attention technologically and application of such ability for selective attention to the perception means, thus enhancing a perception performance in a noisy environment. Particularly, the present invention extends the back propagation of errors to the input layer, in contrast to the conventional error back-propagation system propagating the errors of the output layer only to the first intermediate to learn the weighted value of the intermediate layer.

SUMMARY OF THE INVENTION

It is, therefore, an object of the present invention to provide a selective attention method using neural networks in which a selective filter acquired through an error back propagation process is added before the conventional perception means to technologically implement a selective attention mechanism naturally occurring in the human brain and adapt the selective attention mechanism to the perception means, thus enhancing perception performance in the noisy environment.

It is another object of the present invention to provide a selective attention method using neural networks in which the error of the output layer are propagated in the reverse direction to the input layer in contrast to the conventional error back-propagation system which propagates the error of the output layer to the first intermediate layer to acquire a weighted value of the intermediate layer.

To achieve the object of the present invention, there is provided a selective attention method using a neural network, in a learning pattern of a weighted value of the neural network in a pattern recognition method using a multi-layer perceptron which is an feed-forward neural network. The selective attention method including the steps of: (1) optionally selecting a target value $t=[t_1, \ldots, t_k, \ldots, t_M]$ of an output layer with respect to a given input pattern $x=[x_1, \ldots, x_k, \ldots, x_N]$; (2) calculating an output error E between an output value of the input pattern and the target value, according to an equation defined as $E=\|t-y\|^2$, wherein y represents the output value of the input pattern; and (3) learning the input pattern iteratively until the output error calculated in step (2) is less than a predetermined threshold value, thus learning the input value so as to perceive only a desired signal from the input pattern mixed with a noise.

During the steps (2) and (3), the selective attention method further includes the steps of: calculating $$-\frac{\partial E}{\partial x_k}$$

for a given input pattern x; and iteratively learning the input pattern x to satisfy a relationship defined as $$x_{i(new)} = x_{i(old)} + \left(-\frac{\partial E}{\partial x_i}\right),$$

wherein assuming that an output value of the i'th neuron of the l'th intermediate layer of an feed-forward neural network is $h_i^l$; an error value for back propagation of the neuron is $$\delta_i^1 = -\frac{\partial E}{\partial h_i^1};$$

and a weighted value of the neuron between the i'th neuron of the (l−1)'th intermediate layer and the j'th neuron of the l'th intermediate layer is $w_{ji}^l$, a conventional learning method for the weighted value of the feed-forward neural network, an error back-propagation method is applied to the learning of the input pattern x to define $$\delta_i^0 = -\frac{\partial E}{\partial x_i}$$

and calculate $$\delta_i^0 = -\sum_j w_{ji}^1 \delta_j^1.$$

In another aspect of the present invention, there is provided a selective attention method using a neural network, in a learning pattern of a weighted value of the neural network in a pattern perception method using a multi-layer perceptron which is an feed-forward neural network, the selective attention method including the steps of: (1) optionally selecting a target value $t=[t_1, \ldots, t_k, \ldots, t_M]$ of an output layer with respect to a given input pattern $x=[x_1, \ldots, x_k, \ldots, x_N]$; (2) calculating an output error E between an output value of the input pattern and the target value, according to an equation defined as $E=\|t-y\|^2$, wherein y represents the output value of the input pattern; and (3) calculating $$\delta_i^0 = -\frac{\partial E}{\partial x_i}$$

and adapting an input value with a learning rate $\eta$ to satisfy the relationship defined as $x_{i(new)}=x_{i(old)}+\eta\delta_i^O$, wherein instead of directly changing the input pattern x, a filter having an attention gain $a_k$ is added between an input terminal of the network and the input terminal of a multi-layer perceptron, wherein an output value of the filter $\hat{x}=[\hat{x}_1, \ldots, \hat{x}_k, \ldots, \hat{x}_N]$ (wherein x represents a pattern to be perceived as the input of the filter) is defined as $\hat{x}_k=a_k \cdot x_k$, wherein the value $\hat{x}$ is applied as an input of the multi-layer perceptron to substitute learning of the input pattern with a filter design through a learning of the weighted value $a_k$ of a synapse having a local link, thus calculating $a_{i(new)}=a_{i(old)}+\eta\delta_i^O x_i$ as in the same manner as in learning the weighted value $a_k$ of the synapse with the conventional multi-layer perceptron.

Furthermore, in perceiving patterns such as voices or characters by a selective attention method using a neural network, in a learning pattern of a weighted value of the neural network in a pattern recognition method using a multi-layer perceptron which is an feed-forward neural network, wherein the selective attention method comprises the steps of: (i) optionally selecting a target value $t=[t_1, \ldots, t_k, \ldots, t_M]$ of an output layer with respect to a given input pattern $x=[x_1, \ldots, x_k, \ldots, x_N]$; (ii) calculating an output error E between an output value of the input pattern and the target value, according to an equation defined as $E=\|t-y\|^2$, wherein y represents the output value of the input pattern; and (iii) learning the input pattern iteratively until the output error calculated in step (ii) is less than a predetermined threshold value, thus learning the input value so as to perceive only a desired signal from the input pattern mixed with a noise, a method for applying the selective attention with the neural network includes the steps of: (1) selecting at least two candidate classes from the outputs of the multi-layer perceptron and applying the selective attention method to the individual candidate classes to design a selective filter; (2) defining a new criterions for perception using a distance between the output $\hat{x}$ and the input x of the selective filter designed in step (1); and (3) applying the input pattern x to be perceived with an attention gain $a_k$ fixed at 1 to calculate the output of the feed-forward neural network, and determining a target value for every C classes having the highest output value to calculate $a_{i(new)}=a_{i(old)}+\eta\delta_i^O x_i$.

Furthermore, in perceiving patterns such as voices or characters by a selective attention method using a neural network, in a learning pattern of a weighted value of the neural network in a pattern perception method using a multi-layer perceptron which is an feed-forward neural network, wherein the selective attention method comprises the steps of: (i) optionally selecting a target value $t=[t_1, \ldots, t_k, \ldots, t_M]$ of an output layer with respect to a given input pattern $x=[x_1, \ldots, x_k, \ldots, x_N]$; (ii) calculating an output error E between an output value of the input pattern and the target value, according to an equation defined as $E=\|t-y\|^2$, wherein y represents the output value of the input pattern; and (iii) learning the input pattern iteratively until the output error calculated in step (ii) is less than a predetermined threshold value, thus learning the input value so as to perceive only a desired signal from the input pattern mixed with a noise, a method for applying the selective attention with the neural network includes the steps of: (1) selecting at least two candidate classes from the outputs of the multi-layer perceptron and applying the selective attention method to the individual candidate classes to design a selective filter; (2) calculating a Euclidean distance between the output $\hat{x}$ of the filter calculated in step (ii) and the original input x according to an equation defined as $D_c=\|x-\hat{x}_c\|^2$, determining an error of the output layer after learning of $a_k$ in the step (iii) according to an equation defined as $E_c=\|t_c-y(\hat{x}_c)\|^2$, and defining a criterion for perception as $$M_c = \frac{O_c}{(D_c)^\alpha \cdot (E_c)^\beta},$$

wherein $O_c$ represents the original output value of the corresponding output class of the multi-layer perceptron; and (3) applying the input pattern x to be perceived with an attention gain $a_k$ fixed at 1 to calculate the output of the feed-forward neural network, and determining a target value for every C classes having the highest output value to calculate $a_{i(new)}=a_{i(old)}+\eta\delta_i^O x_i$.

Additional objects, advantages, and novel features of this invention will become apparent to those skilled in the art upon examination of the following examples thereof, which are not intended to be limiting.

DETAILED DESCRIPTION OF THE PREFERRED EMBODIMENT

Hereinafter, reference will be made to a selective attention method using a neural network according to the present invention in connection to the accompanying drawings.

Figure 2:
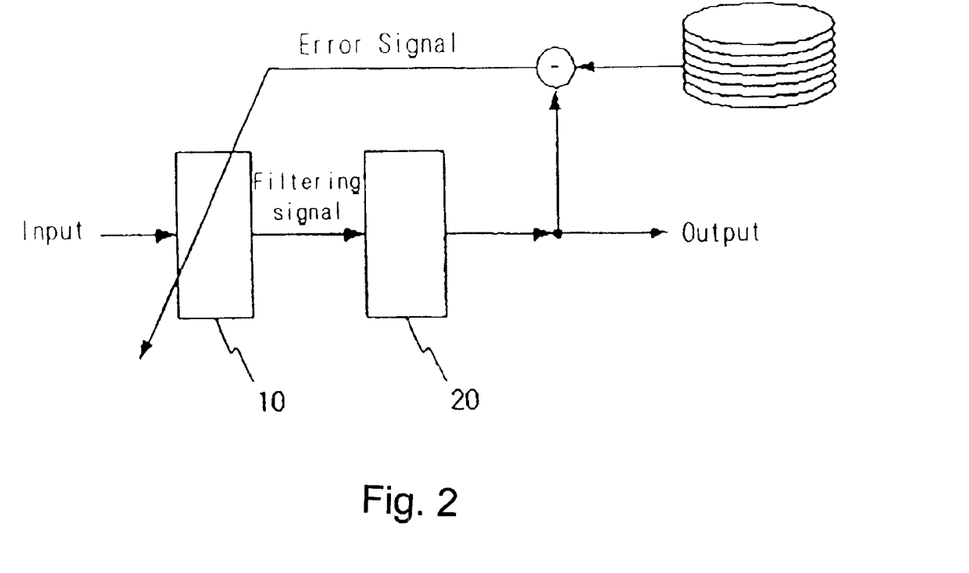
FIG. 2 is an exemplary diagram for explaining a recognition process of a selective attention model implemented in the present invention.

FIG. 2 is a diagram for explaining a selective attention mechanism occurring in a human brain in terms of a selective attention algorithm implemented in the present invention in an aspect of the cognitive science.

Referring to FIG. 2, input signals pass through a perception means, that is, a selective filter 10 prior to a processor 20 of the brain. During this process, the selective filter 10 passes only a single desired signal to the processor 20 while attenuating the remaining unwanted signals.

The selective filter 10 must be configured automatically based on a target value expected from the knowledge. Such an automatic configuration is implemented through the brain's determining a virtual target value according to the memories about the desired input signal and learning the coefficient of the filter as to minimize the difference between the target value and the output signal of the recognition network.

Figure 3:
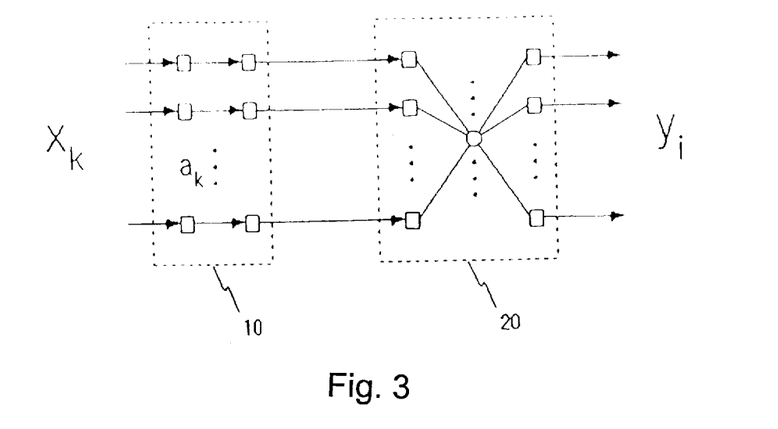
FIG. 3 is a schematic diagram illustrating a feed-forward neural network and a selective filter that implement the selective attention model of the present invention.

FIG. 3 illustrates a neural network implemented in terms of the above-described multi-layer perceptron and the error back-propagation system.

First, the background art of the present invention will be defined as follows:

In the above-described error back-propagation system, the term $\delta_j^l$ represents a term for differentiation of a function of the error in the output layer based on the input value of the i'th neuron in the l'th intermediate layer or output layer. Assuming that the term $\delta$ propagates to the input layer, it can be expressed in Equation 6.

$$\delta_k^0 = -\frac{\partial E}{\partial x_k} \quad \text{[Equation 6]}$$

This expression shows the direction and the amount of changing the input value to decrease the errors of the output layer. The variable $\delta_j^l$ may be simply calculated according to Equation 7 expanding the conventional error back-propagation system.

$$\delta_k^0 = -\sum_i w_{jk}^1 \delta_j^1 \quad \text{[Equation 7]}$$

Here, the variable $\delta_j^l$ represents the term $\delta$ of the j'th neuron of the first intermediate layer.

Thus, as shown in FIG. 3, a change of the input term as Equation 5 can be substituted with a change of the weighted value of an additional intermediate layer, which is confined to link an external input to the input of the multi-layer perceptron on a one-to-one basis between the input terminal and the perception means.

That is, as defined in Equation 8, the input $\hat{x}_k$ of the conventional multi-layer perceptron is a multiple of the actual input $x_k$ by an attention gain $a_k$. Changing the attention gain results in a change of the input of the multi-layer perceptron.

$$\hat{x}_k = a_k \cdot x_k \quad \text{[Equation 8]}$$

Here, learning the attention gain $a_k$ is to consider the additional attention layers as a part of the multi-layer perceptron, in which case the conventional error back-propagation system may be adapted according to Equation 9, $$a_{k(new)} = a_{k(old)} + \eta x_k \delta_k^O \quad \text{[Equation 9]}$$

where the term $a_k^O$ is defined as Equation 6 and given by Equation 7.

Figure 4A:
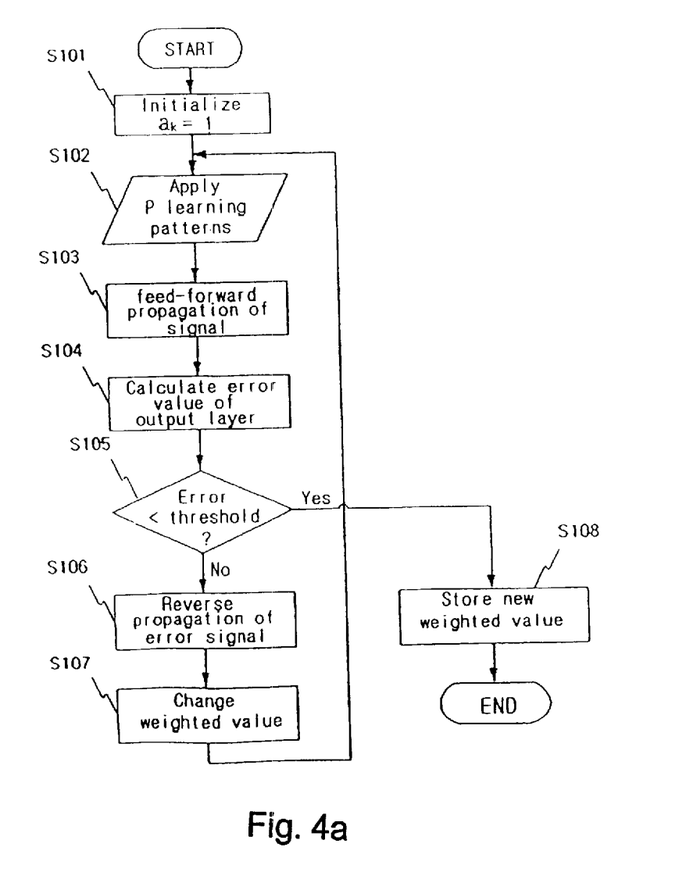
FIGS. 4a and 4b are flow charts for explaining a selective attention mechanism according to the present invention.
Figure 4B:
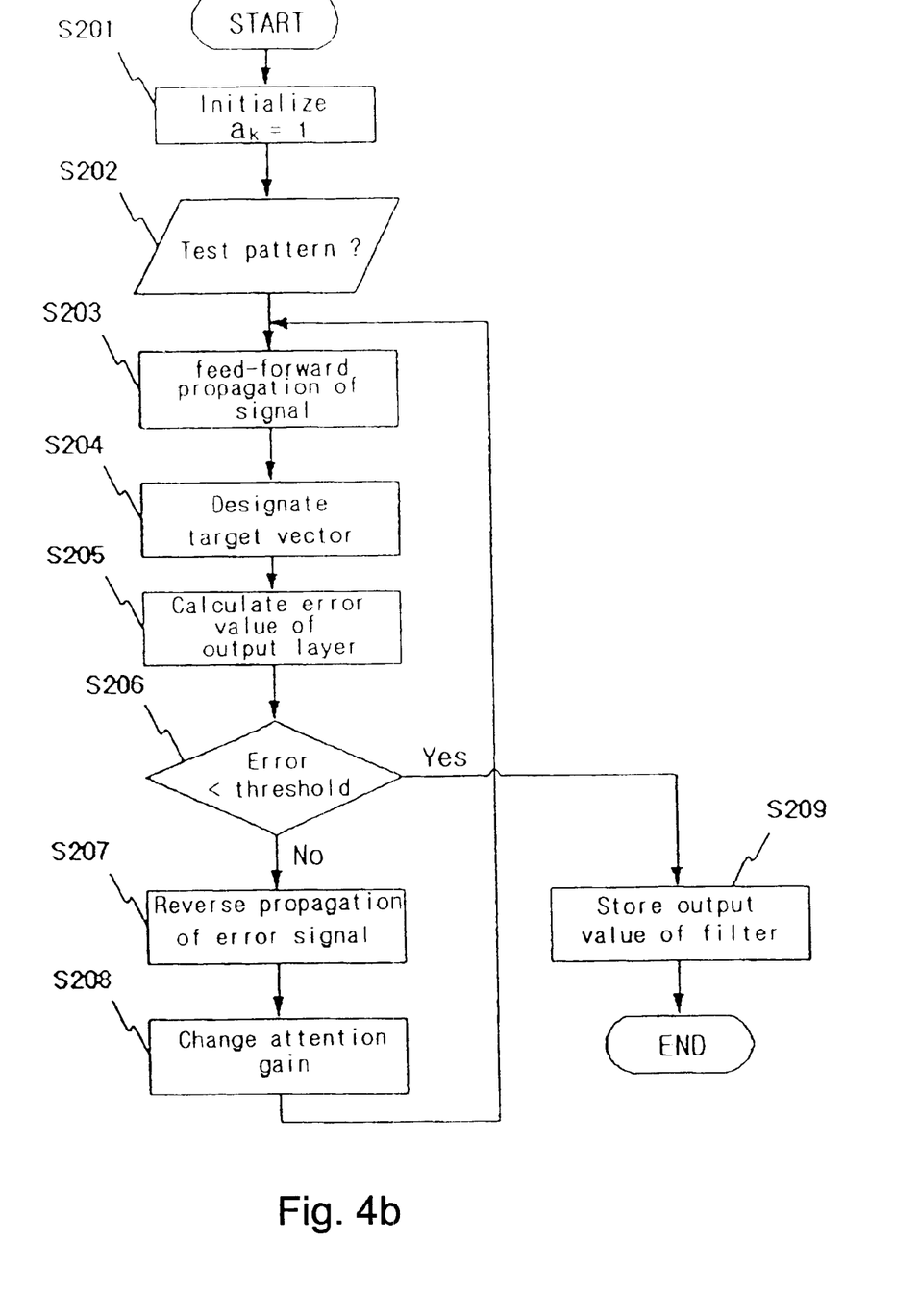

A selective attention process using such a learning algorithm can be summarized as the flow charts of FIGS. 4a and 4b, in which a selective filter is configured to link the actual input to the input of the multi-layer perceptron passed through the filter on an one-to-one basis using the attention gain as a filter coefficient.

First, as illustrated in FIG. 4a, the learning process involves fixing the attention gain $a_k$ at 1 (in S101) and transferring the actual input to the multi-layer perceptron to learn a weighted value of the synapse of the multi-layer perceptron (in S102–S108).

This process is analogous to the conventional error back-propagation method and will not be described in further detail. With the attention gain $a_k$ fixed at 1 (in S101), P learning patterns are applied (in S102), followed by feed-forward propagation of input signals (in S103) and calculation of an error value of the output layer resulting from the feed-forward propagation of the input signals (in S104).

Then, it is determined in S105 whether the error value calculated in S104 is less than a threshold. If the error value is not less than the threshold, the error propagates in a reverse direction (in S106) and the weighted value of the error is changed (in S107), then turning to S102.

On the other hand, if the error value is less than the threshold in S105, it goes to S108 to store the corresponding weighted value and end the procedure.

The weighted value of the synapse acquired in the learning process is used to learn a fixed attention gain and selectively receive the input signals.

For this purpose, a procedure as illustrated in FIG. 4b must be performed. First, the attention gain $a_k$ is initialized at 1 (in S201) and a test pattern signal is read out (in S202).

The test pattern signal is applied to the network to obtain an output value of the multi-layer perceptron through feed-forward propagation of the signal. Then, a desired signal is designated to pass through the filter in S204 through S208, which procedures are iteratively performed until the error of the output layer is less than a given threshold value. During this process, the desired signal is externally applied or set to a class having the maximum output value of the network.

More specifically, a target value is assumed in S204 and the value $\delta$ at the first intermediate layer is calculated according to Equations 3, 4 and 5 in S205.

Then, it is determined in S206 whether the error value calculated in S205 is less than a predetermined threshold value.

If the error value is not less than the threshold value, the error is propagated in a reverse direction to change the attention gain (in S207 and S208), after which the flow of the process returns to S203. In S208, the attention gain is changed according to Equations. 7 and 9.

The procedures of S206 to S208 are iteratively performed until the error of the output layer becomes less than the threshold with respect to the newly determined attention gain.

If the error of the output layer calculated in S205 is less than the threshold value, the output of the filter considered as a desired one of the actual input signals is stored (in S209) and transferred to the subsequent steps.

This learning process of the attention layer conforms to the initial selection theory derived from the studies on the selective attention in the psychology. This results from the fact that the selective filter of the initial selection theory is automatically set based on a desired target value through expansion of the proposed back propagation method. The selective attention algorithm of the present invention is used to recognize patterns in the noisy environment to enhance perception performance.

Figure 5:
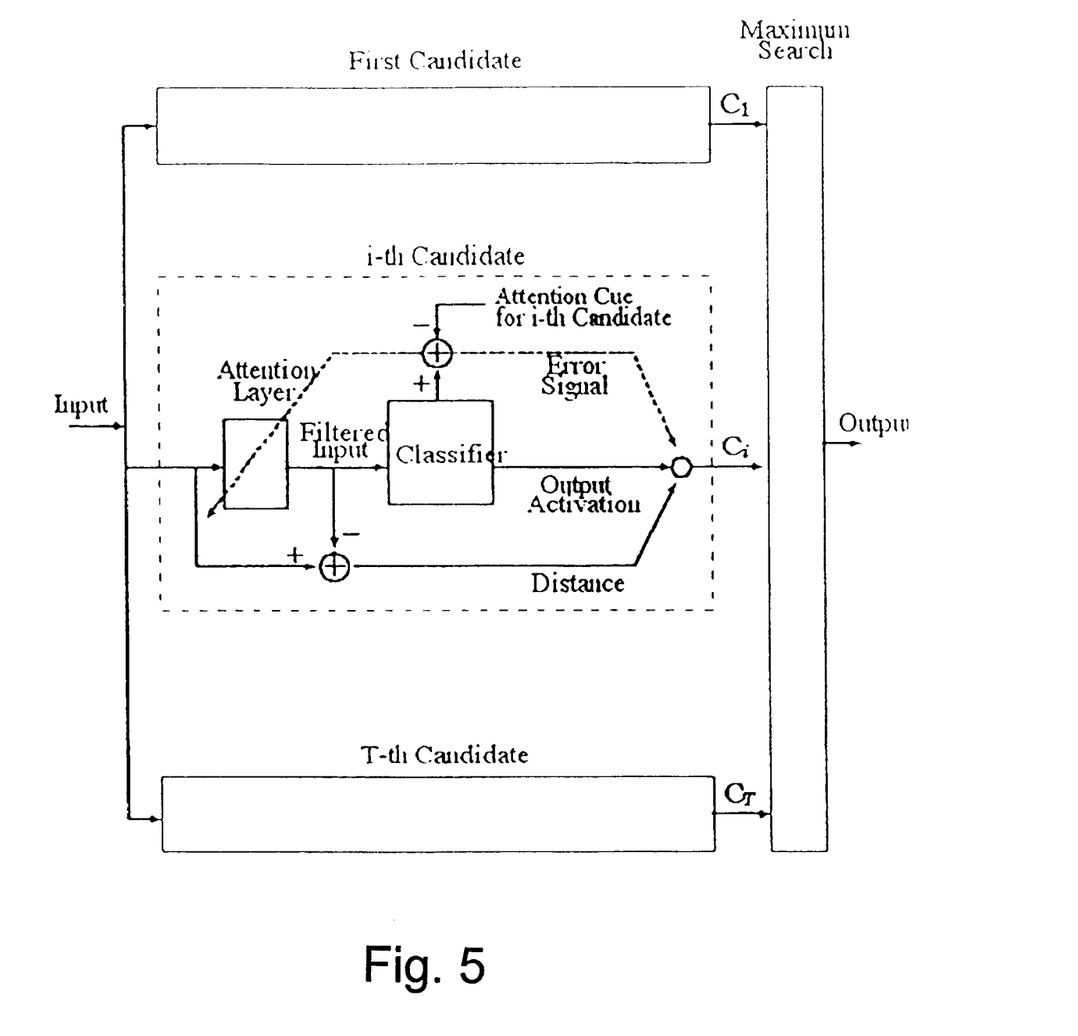
FIG. 5 is a schematic diagram illustrating a system used for the pattern perception using the selective attention algorithm according to the present invention.

FIG. 5 is a block diagram illustrating a system adapted to the present invention selective attention algorithm for perceiving patterns such as voices or characters.

The novel system provides $N_c$ percepts (where $N_c \geq 2$) from one input pattern using the conventional multi-layer perceptron.

Based on the individual percepts, the selective attention algorithm configures a filter and calculates the output value of the filter in the manner as illustrated in FIGS. 4a and 4b. Here, the output value of the filter results from a modification of the input pattern intended to minimize the error of the output under assumption that the current input belongs to the corresponding class.

Assuming that the output of the filter is $\hat{x}_c$ (where $1 \leq c \leq C$) after selective attention to C candidate output classes (where C>2) corresponding to an input vector x, the Euclidean distance between the two vectors corresponding to the c'th candidate output class can be expressed by Equation 10.

$$D_c = \|x - \hat{x}_c\|^2 \qquad \text{[Equation 10]}$$

It is expected from Equation 10 that the distance between the two vectors is smaller when the input pattern substantially belongs to the assumed output class. Thus the Euclidean distance is usable as a criterion for perception to enhance perception performance.

Another important criterions for perception may include error convergence $E_c$ in the selective attention process and the original output value of the multi-layer perceptron $O_c$ indicating a probability that the original input pattern belongs to the output class. These criterions $E_c$ and $O_c$ can be expressed in Equations 11 and 12, respectively.

$$E_c = \|t_c - y(\hat{x}_c)\|^2 \qquad \text{[Equation 11]}$$

$$O_c = y_c(x) \qquad \text{[Equation 12]}$$

where $t_c$ represents a target vector corresponding to the target class of the c'th candidate; $y(\hat{x}_c)$ represents an output vector of the multi-layer perceptron based on an input $\hat{x}_c$; and $y_c(x)$ represents the output of the n'th neuron in the output layer based on an input x.

Accordingly, a criterion for perception given by Equation 13 is derived from Equations 10, 11 and 12.

$$M_c = \frac{O_c}{(D_c)^\alpha \cdot (E_c)^\beta} \qquad \text{[Equation 13]}$$

Thus a pattern perception means using the selective attention algorithm calculates the criterions for C candidate classes according to Equation 13 and then selects one candidate class of the highest criterion as the final percept.

As described above, the selective attention method according to the present invention involves an algorithm for changing an input pattern mixed with a noise into a new input pattern indicating a target vector designated according to the input pattern. This process provides an approach to explain and implement the ability of selective attention in the human brain, particularly, the ability to attenuate unwanted signals among a number of signals.

Also, the selective attention mechanism is applicable to the perception of characters or other patterns to determine a criterion for perception of several candidate classes prior to the final selection and thus dramatically enhance the perception performance.

Furthermore, the implemented network stimulates the selective attention mechanism occurring in the human brain in the aspect of the cognitive science and provides a high perception performance relative to the conventional recognition system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A selective attention method using a neural network, in a learning pattern of a weighted value of the neural network in a pattern recognition method using a multi-layer perceptron which is a feed-forward neural network, wherein the selective attention method comprising the steps of: (i) optionally selecting a target value $t = [t_1, \ldots, t_k, \ldots, t_M]$ of an output layer with respect to a given input pattern $x = [x_1, \ldots, x_k, \ldots, x_N]$; (ii) calculating an output error E between an output value of the input pattern and the target value, according to an equation defined as $E = \|t - y\|^2$, wherein y represents the output value of the input pattern; and (iii) learning the input pattern iteratively until the output error calculated in step (2) is less than a predetermined threshold value, thus learning the input value so as to perceive only a desired signal from the input pattern mixed with a noise wherein the steps (ii) and (iii) comprises:

calculating $$-\frac{\partial E}{\partial x_k}$$

for a given input pattern x; and
iteratively learning the input pattern x to satisfy a relationship defined as $$x_{i(new)} = x_{i(old)} + \left(-\frac{\partial E}{\partial x_i}\right),$$

wherein assuming that an output value of the i'th neuron of the l'th intermediate layer of an feed-forward neural network is $h_i^l$; an error value for back propagation of the neuron is $$\delta_i^l = -\frac{\partial E}{\partial h_i^l};$$

and a weighted value of the neuron between the i'th neuron of the (l−1)'th intermediate layer and the j'th neuron of the l'th intermediate layer is $w_{ji}^l$, a conventional learning method for the weighted value of the feed-forward neural network, an error back-propagation method is applied to the learning of the input pattern x to define $$\delta_i^0 = -\frac{\partial E}{\partial x_i}$$

and calculate $$\delta_i^0 = -\sum_j w_{ji}^1 \delta_j^1.$$

2. A selective attention method using a neural network, in a learning pattern of a weighted value of the neural network in a pattern perception method using a multi-layer perceptron which is an feed-forward neural network, the selective attention method comprising the steps of:
(1) optionally selecting a target value $t=[t_1, \ldots, t_k, \ldots, t_N]$ of an output layer with respect to a given input pattern $x=[x_1, \ldots, x_k, \ldots, x_N]$;
(2) calculating an output error E between an output value of the input pattern and the target value, according to an equation defined as $E=\|t-y\|^2$, wherein y represents the output value of the input pattern; and
(3) calculating $$\delta_i^0 = -\frac{\partial E}{\partial x_i}$$

and learning an input value at a learning rate η to satisfy the relationship defined as $x_{i(new)}=x_{i(old)}+\eta\delta_i^O$, wherein instead of directly changing the input pattern x, a filter having an attention gain $a_k$ is added between an input terminal and the input terminal of a multi-layer perceptron, wherein an output value of the filter $\hat{x}=[\hat{x}_1, \ldots, \hat{x}_k, \ldots, \hat{x}_N]$ (wherein x represents a pattern to be perceived as the input of the filter) is defined as $\hat{x}_k=a_k\cdot x_k$, wherein the value $\hat{x}$ is applied as an input of the multi-layer perceptron to substitute learning of the input pattern with a filter design through a learning of the weighted value $a_k$ of a synapse having a local link, thus calculating $a_{i(new)}=a_{i(old)}+\eta\delta_i^O x_i$ as in the same manner as in learning the weighted value of the synapse with the conventional multi-layer perceptron.

3. In perceiving patterns such as voices or characters by a selective attention method using a neural network, in a learning pattern of a weighted value of the neural network in a pattern perception method using a multi-layer perceptron which is an feed-forward neural network, wherein the selective attention method comprises the steps of: (i) optionally selecting a target value $t=[t_1, \ldots, t_k, \ldots, t_M]$ of an output layer with respect to a given input pattern $x=[x_1, \ldots, x_k, \ldots, x_N]$; (ii) calculating an output error E between an output value of the input pattern and the target value, according to an equation defined as $E=\|t-y\|^2$, wherein y represents the output value of the input pattern; and (iii) learning the input pattern iteratively until the output error calculated in step (ii) is less than a predetermined threshold value, thus learning the input value so as to perceive only a desired signal from the input pattern mixed with a noise, a method for applying the selective attention with the neural network comprising the steps of:
(1) selecting at least two candidate classes from the outputs of the multi-layer perceptron and applying the selective attention method to the individual candidate classes to design a selective filter;
(2) calculating a Euclidean distance between the output $\hat{x}$ of the filter calculated in step (ii) and the original input x according to an equation defined as $D_c=\|x-\hat{x}_c\|^2$, determining an error of the output layer after learning of $a_k$ in the step (iii) according to an equation defined as $E_c=\|t_c-y(\hat{x}_c)\|^2$, and defining a criterion for perception as $$M_c = \frac{O_c}{(D_c)^\alpha \cdot (E_c)^\beta},$$

wherein $O_c$ represents the original output value of the corresponding output class of the multi-layer perceptron; and
(3) applying the input pattern x to be perceived with an attention gain $a_k$ fixed at 1 to calculate the output of the feed-forward neural network, and determining a target value for every C classes having the highest output value to calculate $a_{i(new)}=a_{i(old)}+\eta\delta_i^O x_i$.

* * * * *

UNITED STATES PATENT AND TRADEMARK OFFICE
CERTIFICATE OF CORRECTION

PATENT NO. : 6,601,052 B1
DATED : July 29, 2003
INVENTOR(S) : Soo Young Lee et al.

It is certified that error appears in the above-identified patent and that said Letters Patent is hereby corrected as shown below:

Column 5,
Line 37, "$t=[t_l,..., t_k,..., t_N]$" should be -- $t=[t_1,..., t_k,..., t_M]$ --
Lines 6 and 39, "$x=[x_l,..., x_k,..., x_N]$" should be -- $x=[x_1,..., x_k,..., x_M]$ --

Column 6,
Line 2, "$t=[t_l,..., t_k,..., t_N]$" should be -- $t=[t_1,..., t_k,..., t_M]$ --
Line 4, "$x=[x_l,..., x_k,..., x_N]$" should be -- $x=[x_1,..., x_k,..., x_M]$ --

Column 10,
Line 31, "$t=[t_l,..., t_k,..., t_N]$" should be -- $t=[t_1,..., t_k,..., t_M]$ --
Line 33, "$x=[x_l,..., x_k,..., x_N]$" should be -- $x=[x_1,..., x_k,..., x_M]$ --
Line 41, the word "wherein" should be deleted.

Column 11,
Line 20, "$t=[t_l,..., t_k,..., t_N]$" should be -- $t=[t_1,..., t_k,..., t_<]$ --
Lines 22 and 39, "$x=[x_l,..., x_k,..., x_N]$" should be -- $x=[x_1,..., x_k,..., x_M]$ --

Column 12,
Line 8, "$t=[t_l,..., t_k,..., t_N]$" should be -- $t=[t_1,..., t_k,..., t_M]$ --
Line 9, "$x=[x_l,..., x_k,..., x_N]$" should be -- $x=[x_1,..., x_k,..., x_M]$ --

Signed and Sealed this

Twentieth Day of April, 2004

JON W. DUDAS
*Acting Director of the United States Patent and Trademark Office*